United States Patent [19]

Kitamura et al.

[11] Patent Number: 5,698,646
[45] Date of Patent: Dec. 16, 1997

[54] PROCESS FOR PRODUCING ELASTOMERIC COMPOUND HAVING REDUCED HYSTERESIS

[75] Inventors: Takashi Kitamura, Akron; Mark L. Stayer, Jr., Suffield, both of Ohio; Akira Matsuda, Kodaira City, Japan

[73] Assignee: Bridgestone Corporation, Tokyo, Japan

[21] Appl. No.: 467,370

[22] Filed: Jun. 6, 1995

Related U.S. Application Data

[62] Division of Ser. No. 56,281, Apr. 30, 1993, abandoned.

[51] Int. Cl.$^6$ ............................ C08F 4/56; C08F 236/10
[52] U.S. Cl. ................ 526/174; 526/180; 526/181; 526/340; 525/331.9; 525/332.9; 525/332.3; 525/370; 524/572; 524/575
[58] Field of Search ........................ 526/174, 175, 526/173, 180, 181; 525/332.9, 332.3, 370; 524/572, 575

[56] References Cited

U.S. PATENT DOCUMENTS

| | | | |
|---|---|---|---|
| 2,849,432 | 8/1958 | Kibler et al. | 260/94.2 |
| 3,109,871 | 11/1963 | Zalinski et al. | 260/85.1 |
| 3,177,190 | 4/1965 | Hsieh | 260/94.2 |
| 3,178,398 | 4/1965 | Strobel et al. | 260/85.1 |
| 3,290,277 | 12/1966 | Anderson et al. | 260/88.2 |
| 3,294,768 | 12/1966 | Wofford | 260/83.7 |
| 3,317,918 | 5/1967 | Foster | 260/83.7 |
| 3,393,182 | 7/1968 | Trepka | 260/79.5 |
| 3,426,006 | 2/1969 | Nützel et al. | 260/83.5 |
| 3,439,049 | 4/1969 | Trepka | 260/624 |
| 3,856,877 | 12/1974 | Otsuki et al. | 260/677 R |
| 3,862,077 | 1/1975 | Schulz et al. | 260/29.6 RB |
| 3,935,177 | 1/1976 | Muller et al. | 260/84.7 |
| 4,015,061 | 3/1977 | Schulz et al. | 526/178 |
| 4,026,865 | 5/1977 | Uraneck et al. | 260/42.32 |
| 4,085,265 | 4/1978 | Otsuki et al. | 526/49 |
| 4,247,418 | 1/1981 | Halasa et al. | 252/431 N |
| 4,316,001 | 2/1982 | Boileau et al. | 582/14 |
| 4,383,085 | 5/1983 | Fujimaki et al. | |
| 4,414,372 | 11/1983 | Farnham et al. | 526/190 |
| 4,429,091 | 1/1984 | Hall | 526/181 |
| 4,476,240 | 10/1984 | Hall et al. | 502/155 |
| 4,478,953 | 10/1984 | Yuki et al. | 502/155 |
| 4,515,922 | 5/1985 | Sakakibara et al. | 525/99 |
| 4,614,771 | 9/1986 | Watanabe et al. | 525/351 |
| 4,616,069 | 10/1986 | Watanabe et al. | 525/370 |
| 4,647,634 | 3/1987 | Jalics | 526/174 |
| 4,677,153 | 6/1987 | Kitahara et al. | 524/552 |
| 4,734,461 | 3/1988 | Roggero et al. | 525/293 |
| 4,735,994 | 4/1988 | Roggero et al. | 525/279 |
| 4,736,003 | 4/1988 | Schneider et al. | 526/190 |
| 4,791,174 | 12/1988 | Bronstert et al. | 525/274 |
| 4,816,520 | 3/1989 | Bronstert | 525/285 |
| 4,835,209 | 5/1989 | Kitagawa et al. | 524/507 |
| 4,843,120 | 6/1989 | Halasa et al. | 525/53 |
| 4,894,409 | 1/1990 | Shimada et al. | 524/492 |
| 4,914,147 | 4/1990 | Mouri et al. | 524/495 |
| 4,931,376 | 6/1990 | Ikematsu et al. | 526/164 |
| 4,935,471 | 6/1990 | Halasa et al. | 525/359.1 |
| 4,978,754 | 12/1990 | Ibi et al. | 544/176 |
| 5,066,729 | 11/1991 | Stayer, Jr. et al. | 525/315 |
| 5,115,035 | 5/1992 | Shiraki et al. | 525/314 |
| 5,149,457 | 9/1992 | Smith | 252/182.12 |
| 5,153,159 | 10/1992 | Antkowiak et al. | 502/155 |
| 5,292,790 | 3/1994 | Shimizu et al. | 524/496 |
| 5,354,822 | 10/1994 | Antkowiak et al. | 526/180 |

FOREIGN PATENT DOCUMENTS

| | | |
|---|---|---|
| 0 067 111 | 5/1982 | European Pat. Off. . |
| 0 207 565 | 6/1986 | European Pat. Off. . |
| 0 264 506 | 10/1986 | European Pat. Off. . |
| 0 282 437 | 3/1988 | European Pat. Off. . |
| 0 290 883 | 4/1988 | European Pat. Off. . |
| 0 316 255 | 10/1988 | European Pat. Off. . |
| 0 451 063 A2 | 3/1991 | European Pat. Off. . |
| 2 679 914 | 7/1992 | France . |
| 138 070 | 10/1979 | Germany . |
| 7965788 | 5/1979 | Japan . |
| 59-164308 | 9/1984 | Japan . |
| 2 117 778 | 3/1983 | United Kingdom . |
| WO 84/03707 | 9/1984 | WIPO . |

OTHER PUBLICATIONS

"Preparation of Some Trialkyltin–lithium Compounds" by Gillman et al., J. Am. Chem. Soc., 75, 2507–2508 (1953).

"Some Reactions of Tributyl–and Triphenyl–stannyl Derivatives of Alkali Metals" by Blake et al., J. Chem. Soc., (1961), 618–622.

"Preparation and Reactions of Trialkyltinlithium" by Tamborski et al., J. Org. Chem., 28, 237 (1963).

"Polymerization of Unsaturated Compounds in the Presence of Lithium Diethylamide", Vinogradov et al., *Polymer Science USSR*, vol. 4, (1963).

"Copolymerization of Butadiene and Styrene by Initiation With Aklyllithium and Alkali Metal *tert*–Butoxides", Wofford and Hsieh, J. of *Polymer Science*, vol. 7, 461–469 (1969).

"An Improved Synthesis of p–Dimethylaminophenyl–Lithium" by G. Hallas and D.R. Waring, May 10, 1969, *Chemistry and Industry*, p. 620.

"Anionic Polymerization Initiated By Diethylamide In Organic Solvents" by Angood et al., Journal of Polymer Science, vol. 11, pp. 2777–2791 (1973).

(List continued on next page.)

*Primary Examiner*—Fred Teskin
*Attorney, Agent, or Firm*—Daniel N. Hall

[57] ABSTRACT

The present invention is directed toward anionic polymerization employing lithio aldimines mixed with an organic alkali metal compound and optionally, a chelating reagent. The lithio aldimines have the general formula (A)Li, where A is derived from a substituted aldimine. The invention is also directed toward polymers and other products made using the initiator, and methods therefor. Further, the invention contemplates a polymer, a polymer composition and products therefrom, which include a functional group from the reaction product of a substituted aldimine and an organolithium compound. The resulting polymers may be modified with a terminating, coupling or linking agent, which may provide the polymer with a multifunctionality.

6 Claims, No Drawings

OTHER PUBLICATIONS

"Anionic Polymerization Initiators Containing Protected Functional Groups and Functionally Terminated Diene Polymers" Journal of Polymer Science Polymer Chemistry Ed., vol. 12, 1974, pp. 153–166, by Schulz et al.

"3–Dimethylaminopropyl–Lithium—An Analytical and Kinetic Investigation of a New Initiator System for Polymer Synthesis" European Polymer Journal, vol. 11, 1975, pp. 699–704, by Eisenbach et al.

"Anionic Polymerization Initiators Containing Protected Functional Groups", Schulz et al., Journal of Polymer Science, vol. 15, pp. 2401–2410 (1977).

"A Bifunctional Anionic Initiator Soluble in Non–Polar Solvents" Makromol. Chem., 179, 1978, pp. 551–555, by Beinert et al.

"Specific Functionalization of Polymers by Carboxyl Group" Broze, et al., Makromol. Chem., 179, 1978, pp. 1383–1386.

*Chemical Abstracts*, vol. 91, No. 12, Sep. 1979, Chiba et al.

"Anionic Polymerization", Cheng, American Chemical Society Symposium Series 166, American Chemical Society, pp. 513–527 (1981).

"New Perfectly Difunctional Organolithium Initiators for Block Copolymer Synthesis: Synthesis of Dilithium Initiators in the Absence of Polar Additives" *Polymer*, vol. 22, Dec., 1981, pp. 1724, by Guyot et al.

"Bifunctional Anionic Initiators: A Critical Study and Overview" Makromol. Chem., 186, 1985, pp. 2017–2024, by Banderman et al.

The first two pages of an English translation of East German Patent No. 247,455 dated 1987.

"Studies of the Anionic Polymerization of Phenyl Vinyl Sulfoxide and Its Copolymer with Styrene" by Kanga et al., *Macromolecules*, 1990, 23, 4235–4240.

"Thermal Elimination of Poly(phenyl vinyl sulfoxide) and Its Polystyrene Block Copolymers" by Kanga et al., *Macromolecules*, 1990, 23, 4241–4246.

"Butadiene–Styrene Copolymerization Initiated by n–BuLi/ThF/t–AmOK", Lehang et al.; J. of Applied Polymer Science; vol. 44, 1499–1505 (1992).

"The Microstructure of Butadiene and Styrene Copolymers Synthesized with n–BuLi/THF/t–AmOK", Lehang et al.; J. of Applied Polymer Science, vol. 44, 1507–1511 (1992).

European Search Report form communication dated Aug. 25, 1994.

PROCESS FOR PRODUCING ELASTOMERIC COMPOUND HAVING REDUCED HYSTERESIS

This application is a division of application Ser. No. 08/056,281, filed Apr. 30, 1993 now abandoned.

TECHNICAL FIELD

The subject invention relates to anionic polymerization resulting in diene polymer and copolymer elastomers. More particularly, the present invention relates to polymerization employing a lithio-aldimine initiator which is a mixture of the reaction product of an aldimine and an organo lithium compound, with an organic alkali metal compound and a chelating reagent. The resulting polymers are chain-end modified and the copolymers of which may contain a high amount of styrene.

BACKGROUND ART

In the art, it is desirable to produce elastomeric compounds exhibiting reduced hysteresis characteristics. Such elastomers, when compounded to form articles such as tires, power belts and the like, will show an increase in rebound, a decrease in rolling resistance and a decrease in heat build-up when mechanical stresses are applied.

A major source of hysteretic power loss has been established to be due to the section of the polymer chain from the site of the last cross link of the vulcanizate to an end of the polymer chain. This free end is not tied to the polymer molecular network and thus cannot be involved in an efficient elastically recoverable process, and as a result, the energy transmitted to this section of the cured sample is lost as heat. It is known in the art that one way to reduce this phenomenon is to prepare higher molecular weight polymers which will have fewer end groups. However, this procedure is not always useful because processability of the rubber with compounding ingredients and during shaping operations can decrease rapidly with increasing molecular weight.

It has also been recognized that carbon black, usually employed as a reinforcing agent in rubber compounds, should be well dispersed throughout the rubber in order to improve various physical properties. One example of the recognition is provided in published European Pat. Appln. EP 0 316 255 A2 which discloses a process for end capping polydienes by reacting a metal terminated polydiene with a capping agent such as a halogenated nitrile, a heterocyclic aromatic nitrogen containing compound or an alkyl benzoate. Additionally, this application discloses that both ends of the polydiene chains can be capped with polar groups by utilizing functionalized initiators, such as lithium amides.

It is known in the art to employ a lithium amide with an alkali metal compound, such as, for example, as discussed in published Japanese Pat. No. 79-65,788. That patent does not disclose the use of a chelating agent as is used in the present invention. Further, this patent is not directed toward a polymer having improved hysteresis characteristics and physical properties. Polymerization to form certain rubber compounds, such as styrene/butadiene rubber (SBR) with higher styrene content by using only a lithium amide initiator and alkali metal compound randomizers in acyclic alkanes, causes the formation of a heterogeneous polymer cement, which is comprised of a mixture of molecules with widely different styrene content molecules. This makes it difficult to achieve the desired molecular weight and difficult to control styrene sequence distribution. The presence of such cements often interferes with desirable rubber properties in the polymer.

Organolithium polymerization initiators are also known in the art. For example, U.S. Pat. No. 3,439,049 discloses an organolithium initiator prepared from a halophenol in a hydrocarbon medium.

U.S. Pat. No. 4,015,061 is directed toward aminofunctional initiators which polymerize diene monomers to form mono- or di-primary aryl amine-terminated diene polymers upon acid hydrolysis.

A major drawback with many of these known initiators, is that they are not soluble in hydrocarbon solvents such as hexane or cyclohexane. Polar solvents have heretofore been employed in their use including the polar organic ethers such as dimethyl or diethyl ether, tetrahydrofuran, or diethylene glycol methyl ether (diglyme).

The present invention provides a process for the incorporation of a functionality from the initiator to be incorporated into the polymer chain, so that the chain ends may be modified. Hysteresis characteristics of the resulting polymeric products are effectively reduced, and other physical characteristics are improved. The invention provides efficient, controllable and reproducible polymerizations, with the preparation of well defined end-products of relatively narrow molecular weight distribution ranges. Furthermore, there is provided a means of controlling the sequence distribution of vinyl aromatic monomers, such as styrene, along a polymer backbone, to improve the polymer hysteresis properties, tear strength and wear resistance.

DISCLOSURE OF THE INVENTION

It is therefore, an object of the present invention to provide a hydrocarbon soluble anionic polymerization initiator.

It is an object of one embodiment of the present invention to provide a randomized, high styrene, styrene/butadiene rubber, which includes polymer chains having modified chain ends.

It is a further object of the present invention to provide a method of preparing such an anionic polymerization initiator.

It is still a further object of the invention to provide an initiator which will reproducibly produce a polymer within a relatively narrow and predictable molecular weight range.

It is another object of the present invention to provide elastomers formed with such a polymerization initiator.

It is also an object of certain embodiments of the present invention to provide diene polymers and copolymers having improved, that is, reduced hysteresis characteristics.

It is a further object of the present invention to provide vulcanizable elastomeric compounds.

Still another object of the present invention is to provide an improved tire formed from the elastomers described above.

An additional object of the invention is to provide randomized, high styrene, styrene/butadiene rubber.

These and other objects together with the advantages thereof over the existing art, which shall become apparent from the specification which follows, are accomplished by the invention as hereinafter described and claimed.

In general, there is provided according to the present invention, a hydrocarbon soluble, anionic polymerization initiator which comprises a mixture of (i) the lithio aldimine reaction product of an organolithium compound and a substituted aldimine having the general formula

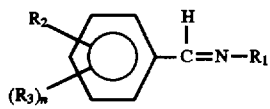

where $R_1$ is selected from the group consisting of alkyls and aralkyls having from 1 to about 20 carbon atoms, with the proviso that the carbon atom adjacent the nitrogen atom contains at least one hydrogen; $R_2$ is selected from the group consisting of dialkyl, alkyl, cycloalkyl or dicycloalkyl amine radicals having the general formula

and cyclic amine radicals having the formula

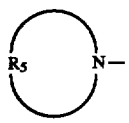

where each $R_4$ is independently selected from the group consisting of alkyls, cycloalkyls and aralkyls having from having from 1 to about 12 carbon atoms, and $R_5$ is selected from the group consisting of a divalent alkylene, oxy- or amino-alkylene groups having from about 3 to about 12 methylene groups; and, $R_3$ is an alkyl group having from 1 to about 12 carbon atoms and n is an integer from 0 to 4; (ii) an organic alkali metal randomizer compound; and, optionally, (iii) a chelating reagent.

There is also provided according to the invention, a method of preparing an anionic polymerization initiator, which method comprises the steps of forming a lithio aldimine reaction product by reacting an organolithium compound with a substituted aldimine having the general formula

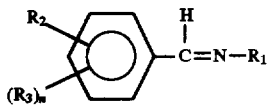

where $R_1$ is selected from the group consisting of alkyls and aralkyls having from 1 to about 20 carbon atoms, with the proviso that the carbon atom adjacent the nitrogen atom contains at least one hydrogen; $R_2$ is selected from the group consisting of dialkyl, alkyl, cycloalkyl or dicycloalkyl amine radicals having the general formula

and cyclic amine radicals having the formula

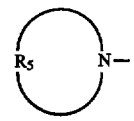

where each $R_4$ is independently selected from the group consisting of alkyls, cycloalkyls and aralkyls having from having from 1 to about 12 carbon atoms, and $R_5$ is selected from the group consisting of a divalent alkylene, oxy- or amino-alkylene groups having from about 3 to about 12 methylene groups; and, $R_3$ is an alkyl group having from 1 to about 12 carbon atoms and n is an integer from 0 to 4; and mixing the reaction product with an organic alkali metal compound; and optionally, a chelating reagent. The organolithium compound has the general formula RLi where R is selected from the group consisting of alkyls, cycloalkyls, alkenyls, alkynyls, aryls and aralkyls having from 1 to about 20 carbon atoms and short chain length low molecular weight polymers from diolefin and vinyl aryl monomers having up to about 25 units.

There is also provided a process for preparing an elastomeric compound having reduced hysteresis properties, which process comprises the steps of forming a solution of one or more anionically polymerizable monomers in a hydrocarbon solvent; and, polymerizing the one or more monomers with a mixture of a lithio aldimine, an organic alkali metal compound and optionally, a chelating reagent, to form a polymer. The lithio aldimine has the general formula ALi wherein A is derived from a substituted aldimine having the general formula

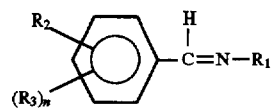

where $R_1$ is selected from the group consisting of alkyls and aralkyls having from 1 to about 20 carbon atoms, with the proviso that the carbon atom adjacent the nitrogen atom contains at least one hydrogen; $R_2$ is selected from the group consisting of dialkyl, alkyl, cycloalkyl or dicycloalkyl amine radicals having the general formula

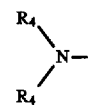

and cyclic amine radicals having the formula

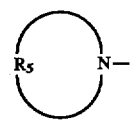

where each $R_4$ is independently selected from the group consisting of alkyls, cycloalkyls and aralkyls having from having from 1 to about 12 carbon atoms, and $R_5$ is selected from the group consisting of a divalent alkylene, oxy- or amino-alkylene groups having from about 3 to about 12 methylene groups; and, $R_3$ is an alkyl group having from 1 to about 12 carbon atoms and n is an integer from 0 to 4; and said organic alkali metal compound is selected from the group consisting of compounds having the general formula $R_6M$, $R_7OM$, $R_8C(O)OM$, $R_9R_{10}NM$, and $R_{11}SO_3M$, where $R_6$, $R_7$, $R_8$, $R_9$ $R_{10}$, and $R_{11}$ are each selected from the group consisting of alkyls, cycloalkyls, alkenyls, aryls, or phenyls, having from about 1 to about 12 carbon atoms; and where M is selected from the group consisting of Na, K, Rb or Cs.

A polymer according to the invention is prepared by forming a solution of one or more anionically polymerizable monomers in a hydrocarbon solvent; and, polymerizing the one or more monomers with a mixture of a lithio aldimine, and an organic alkali metal compound and optionally, a chelating reagent, to form the polymer. The lithio aldimine has the general formula ALi wherein A is derived from a substituted aldimine having the general formula

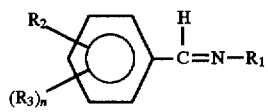

where $R_1$ is selected from the group consisting of alkyls and aralkyls having from 1 to about 20 carbon atoms, with the proviso that the carbon atom adjacent the nitrogen atom contains at least one hydrogen; $R_2$ is selected from the group consisting of dialkyl, alkyl, cycloalkyl or dicycloalkyl amine radicals having the general formula

and cyclic amine radicals having the formula

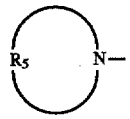

where each $R_4$ is independently selected from the group consisting of alkyls, cycloalkyls and aralkyls having from having from 1 to about 12 carbon atoms, and $R_5$ is selected from the group consisting of a divalent alkylene, oxy- or amino-alkylene groups having from about 3 to about 12 methylene groups; and, $R_3$ is an alkyl group having from 1 to about 12 carbon atoms and n is an integer from 0 to 4; and said organic alkali metal compound is selected from the group consisting of compounds having the general formula $R_6M$, $R_7OM$, $R_8C(O)OM$, $R_9R_{10}NM$, and $R_{11}SO_3M$, where $R_6$, $R_7$, $R_8$, $R_9$ $R_{10}$, and $R_{11}$ are each selected from the group consisting of alkyls, cycloalkyls, alkenyls, aryls, or phenyls, having from about 1 to about 12 carbon atoms; and where M is selected from the group consisting of Na, K, Rb or Cs.

PREFERRED EMBODIMENTS FOR CARRYING OUT THE INVENTION

As will become apparent from the description which follows, the present invention provides novel polymerization initiators which are soluble in hydrocarbon solvents, such as preferably, cycloalkanes such as cyclohexane, cycloheptane, derivatives thereof and the like, and mixtures of these with alkanes such as hexane, pentane, heptane, octane, their alkylated derivatives, and the like. By soluble, it is understood to mean a solubility of up to about a one molar concentration at room temperature. It has also been discovered herein that certain rubber compositions, vulcanizable elastomeric compositions and articles thereof based upon polymers formed using such initiators, exhibit useful properties, such as for example, reproducible relatively narrow molecular weight ranges. Furthermore, the polymers according to the invention also contain a functionality from the initiator, which functionality is useful for example, in desirably reducing hysteresis characteristics. Further still, it has been found that products according to the present invention, when mixed with carbon black, also exhibit improved physical properties, such as high tensile and tear strength and wear resistance properties.

The invention is particularly suited, although it is not necessarily limited to, the production of reduced hysteresis, chain-end modified, high styrene styrene/butadiene rubber (SBR). When compounded with other ingredients as will be addressed hereinbelow, the resulting elastomer product possesses increased rebound, decreased rolling resistance and/ or less heat buildup. Such elastomer products can be used to form improved, energy-efficient tires, power belts and mechanical goods.

The present invention employs a mixture of a substituted aldimine, an alkaline metal organic randomizer and optionally, a chelating reagent. This mixture is then used as an initiator to cause an ensuing polymerization, as will also be more fully described hereinbelow. Because of the presence of the alkaline metal organic randomizer and optionally, the chelating reagent, the resulting elastomers and other products according to the invention, exhibit not only reduced hysteresis characteristics, but also improved tensile, tear and wear strengths.

The preferred initiator is a lithio aldimine which is the reaction product of an organolithium compound and a substituted aldimine having the general formula (I)

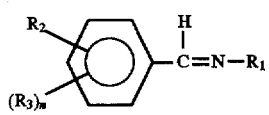

where $R_1$ is selected from the group consisting of alkyls and aralkyls having from 1 to about 20 carbon atoms, with the proviso that the carbon atom adjacent the nitrogen atom contains at least one hydrogen; $R_2$ is selected from the group consisting of dialkyl, alkyl, cycloalkyl or dicycloalkyl amine radicals having the general formula

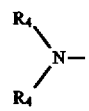

and cyclic amine radicals having the formula

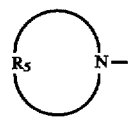

where each $R_4$ is independently selected from the group consisting of alkyls, cycloalkyls and aralkyls having from having from 1 to about 12 carbon atoms, and $R_5$ is selected from the group consisting of a divalent alkylene, oxy- or amino-alkylene groups having from about 3 to about 12 methylene groups; and, $R_3$ is an alkyl group having from 1 to about 12 carbon atoms and n is an integer from 0 to 4. The substituted aldimine of the general formula I is often referred to as a "Schiff base".

One preferred aldimine does not have $R_3$; that is, n=0. Often, $R_2$ is in a para position on the aromatic nucleus of the aldimine. Thus, typical aldimines are of the formula

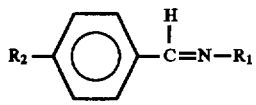 (Ia)

wherein $R_1$ and $R_2$ are as described hereinabove.

It has been found that when one or both R4 and $R_5$ are both t-butyl groups, both isopropyl groups or the like, the resulting polymerizations are slow, presumably due to hindrance around the nitrogen at the initiation site. Hence, in a preferred embodiment of the invention, the carbon atoms in $R_1$ and $R_2$ which are bonded to the nitrogen in the amine, are also (when taken together) bonded to a total of at least three hydrogen atoms.

Examples of such substituted aldimines useful in the present invention include dimethylaminobenzylidenemethylamine, or (DMa)BMA,

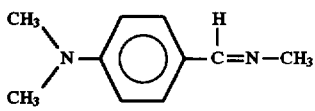

diethylaminobenzylidenemethylamine,

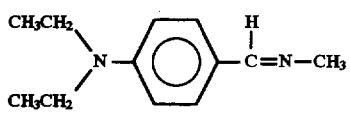

piperidinylbenzylidenemethylamine,

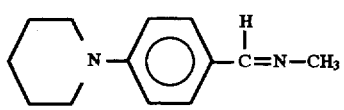

and, dimethylaminobenzylidenebutylamine,

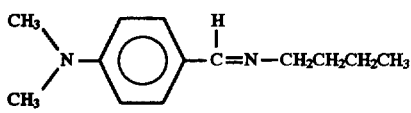

The lithio aldimine thus has the general formula ALi where A is derived from the above described substituted aldimine (formula I), and the lithium atom is bonded to the nitrogen in the substituted aldimine.

The lithio aldimine initiator according to the present invention can be formed by preparing a solution of the substituted aldimine of formula I hereinabove, in an anhydrous, aprotic solvent, such as cyclohexane. This solution is then combined with the organolithium compound in the same or a similar solvent. The organolithium compound has the general formula RLi where R is selected from the group consisting of alkyls, cycloalkyls, alkenyls, alkynyls, aryls and aralkyls having from 1 to about 20 carbon atoms and short chain length low molecular weight polymers from diolefin and vinyl aryl monomers having up to about 25 units. Typical alkyls include n-butyl, s-butyl, methyl, ethyl, isopropyl and the like. The cycloalkyls include cyclohexyl, menthyl and the like. The alkenyls include allyl, vinyl and the like. The aryl and aralkyl groups include phenyl, benzyl, oligo(styryl) and the like. Exemplary short chain length polymers include the oligo(butadienyls), oligo(isoprenyls), oligo(styryls) and the like.

The two components are allowed to react for up to about one hour at ambient temperature (15° to 30° C.), or elevated temperatures up to about 100° C. preferably at less than 50° C., and more preferably at less than 38° C., following which the catalyst is ready for use. The initiators according to the present invention are considered to be soluble if they remain in solution within an excess of a hydrocarbon solvent for about three (3) days at a concentration of up to about one molar.

The organic alkali metal randomizer compound (II) is preferably selected from the group consisting of compounds having the general formula $R_6M$, $R_7OM$, $R_8C(O)OM$, $R_9R_{10}NM$, and $R_{11}SO_3M$ where $R_6$, $R_7$, $R_8$, $R_9$ $R_{10}$, and $R_{11}$ are each selected from the group consisting of alkyls, cycloalkyls, alkenyls, aryls, or phenyls, having from about 1 to about 12 carbon atoms. The component M is selected from the group consisting of Na, K, Rb or Cs. Preferably, M is K.

For example, $R_6M$ may include methyl sodium, ethyl potassium, n-propyl rubidium, ethylcesium, t-butyl sodium, t-amylpotassium, n-hexylrubidium, phenyl potassium, benzyl sodium, and the like.

The compound $R_7OM$, may include for example, alkali metal salts of monovalent and polyvalent alcohols, and monovalent and polyvalent phenols, such as sodium (Na), potassium (K), rubidium (Rb) or cesium (Cs) salts of acetic acid, methyl alcohol, ethyl alcohol, n-propyl alcohol, isopropyl alcohol, t-butyl alcohol, t-amyl alcohol, n-hexyl alcohol, cyclohexyl alcohol, t-butenyl alcohol, 4-methylcyclohexyl alcohol, phenol, benzyl alcohol, catechol, resorcinol, 1-naphthol, 2,6-di-t-butyl-methylphenol, n-nonylphenol, and the like.

The $R_8COOM$ may include for example, alkali metal salts of mono- and poly-carboxylic acids such as Na, K, Rb and Cs salts of acetic acid, lauric acid, myristic acid, palmitic acid, stearic acid, arachic acid, linoleic acid, phenylacetic acid, benzoic acid, sebacic acid, phthalic acid, and the like.

The compound $R_9R_{10}NM$ may include for example, alkali metal salts of secondary amines such as Na, K, Rb and Cs salts of dimethylamine, di-n-butylamine, methyl-n-hexylamine, diphenylamine, dibenzylamine, and the like.

The compound $R_{11}SO_3M$, may include for example, alkali metal salts of sulfonic acids, such as Na, K, Rb and Cs salts of dodecylbenzenesulfonic acid, tetradecylbenzenesulfonic acid, hexadecylbenzenesulfonic acid, octadecyl-benzenesulfonic acid, and the like.

Suitable polymerization modifiers such as ethers or amines may also be used by combining them with alkali metal compounds to provide the desired microstructure and randomization of the comonomer units.

The mixture according to the invention preferably includes a mixture ratio of the organic alkali metal compound of from about 0.5 to about 0.02 equivalents thereof per equivalent of lithium in the lithio aldimine initiator.

The chelating reagent (III) can be employed to help prevent heterogeneous polymerization. Useful such reagents include for example, tetramethylethylenediamine (TMEDA), oxolanyl cyclic acetals and cyclic oligomeric oxolanyl alkanes and the like. The oligomeric oxolanyl alkanes may be represented by the structural formula

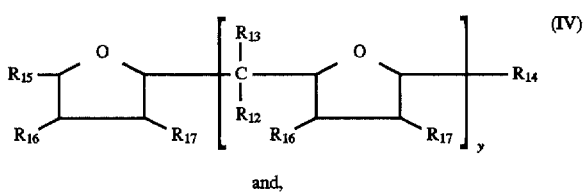

and,

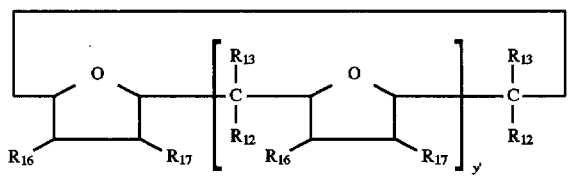

wherein $R_{12}$ and $R_{13}$ independently are hydrogen or an alkyl group and the total number of carbon atoms in —$CR_{12}R_{13}$— ranges between one and nine inclusive; y is an integer of 1 to 5 inclusive; y' is an integer of 3 to 5 inclusive; and $R_{14}$, $R_{15}$, $R_{16}$, and $R_{17}$ independently are —H or —$C_nH_{2n+1}$ wherein n=1 to 6.

The compounds of the formula (IV) are linear oligomers and the modifiers represented by the structural formula (V) are cyclic oligomers. Further details thereof can be found in U.S. Pat. No. 4,429,091, the subject matter of which is incorporated herein by reference. Furthermore, details regarding the oxolanyl cyclic acetals can be found in U.S. Pat. No. 5,112,929, and the subject matter of which is incorporated herein by reference.

The mixture according to the invention preferably includes a mixture ratio of the chelating reagent of from about 2 to about 0.01 equivalents thereof per equivalent of lithium in the lithio aldimine initiator. A ratio in the range of about 0.02 to about 0.1 is preferred.

As stated above, the initiator mixture thus formed may be employed as an initiator to prepare any anionically-polymerized elastomer, e.g., polybutadiene, polyisoprene and the like, and copolymers thereof with monovinyl aromatics such as styrene, alpha methyl styrene and the like, or trienes such as myrcene. Thus, the elastomers include diene homopolymers and copolymers thereof with monovinyl aromatic polymers. Suitable monomers include conjugated dienes having from about 4 to about 12 carbon atoms and monovinyl aromatic monomers having 8 to 18 carbon atoms and trienes, and mixtures thereof. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, a-methylstyrene, p-methylstyrene, vinyltoluene and vinylnaphthalene. The conjugated diene monomer and aromatic vinyl monomer are normally used at the weight ratios of 95–50:5–50, preferably 85–55:15–45. It is most preferred that the polymer have a high styrene content, that is, a styrene content of about 20 percent by weight or more.

Polymerization is conducted in a hydrocarbon solvent as indicated hereinabove, such as the various hexanes, heptanes, octanes, mixtures thereof, and the like. In order to further promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed.

Compounds useful as polar coordinators are organic, and include, for example, tetrahydrofuran, linear and cyclic oligomeric oxolanyl alkanes such as 2-2'-di(tetrahydrofuryl) propane, di-piperidyl ethane, hexamethylphosphoramide, N-N'-dimethylpiperazine, diazabicyclooctane, dimethyl ether, diethyl ether, tributylamine and the like. The linear and cyclic oligomeric oxolanyl alkane modifiers are described above and in U.S. Pat. No. 4,429,091, the subject matter of which is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); tetrahydrofuran (THF), linear THF oligomers and the like.

According to the present invention, a batch polymerization is begun by charging a blend of monomer(s) and hydrocarbon solvent to a suitable reaction vessel, followed by the addition of the polar coordinator (if employed) and the initiator mixture previously described. The reactants are heated to a temperature of from about 20° to about 200° C., and the polymerization is allowed to proceed for from about 0.1 to about 24 hours. A functional imine group is derived from the initiator mixture and bonds at the initiation site. Thus, substantially every resulting polymer chain has the general formula AYLi, where A is as described above, and Y is a divalent polymer radical which is derived from any or all of the foregoing diene homopolymers, monovinyl aromatic polymers, diene/monovinyl aromatic random copolymers and block copolymers. The monomer addition at the lithium end causes the molecular weight of the polymer to increase as the polymerization continues.

To terminate the polymerization, and thus further control polymer molecular weight and polymer properties, a modifying agent such as a terminating agent, coupling agent or linking agent may be employed, all of these agents being collectively referred to herein as "modifying agents". Certain of these agents may provide the resulting polymer with a multifunctionality. That is, the polymers initiated according to the present invention may carry at least one imine functional group A as discussed hereinabove, and may also carry a second functional group selected and derived from the group consisting of modifying agents.

Useful modifying agents include the following or mixtures thereof: active hydrogen compounds such as water or alcohol; carbon dioxide; N,N,N',N'-tetradialkyldiaminobenzophenone (such as tetramethyldiaminobenzophenone or the like); N,N-dialkylamino-benzaldehyde (such as dimethylaminobenzaldehyde or the like); 1,3-dialkyl-2-imidazolidinones (such as 1,3-dimethyl-2-imidazolidinone or the like); 1-alkyl substituted pyrrolidinones; 1-aryl substituted pyrrolidinones; dialkyl- and dicycloalkyl-carbodiimides having from about 5 to about 20 carbon atoms; $(R_{18})_aZX_b$; where Z is tin or silicon. It is preferred that Z is tin and X is chlorine, bromine or iodine, "a" is from 0 to 3, and "b" is from 1 to 4; where a+b=4. Useful modifying agents also include compounds of the formulae:

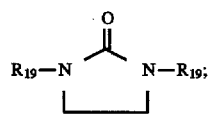

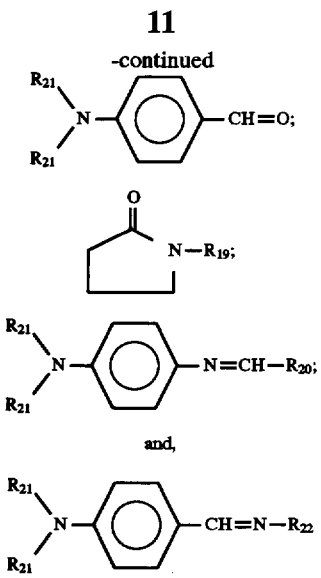

wherein $R_{18}$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_{18}$ may include methyl, ethyl, n-butyl, neophyl, phenyl, cyclohexyl or the like.

Each $R_{19}$ is the same or different and is an alkyl, cycloalkyl or aryl, having from about 1 to about 12 carbon atoms. For example, $R_{19}$ may include methyl, ethyl, nonyl, t-butyl, phenyl or the like.

$R_{20}$ is an alkyl, phenyl, alkylphenyl or dialkylaminophenyl, having from about 1 to about 20 carbon atoms. For example, $R_{20}$ may include t-butyl, 2-methyl-4-pentene-2-yl, phenyl, p-tolyl, p-butylphenyl, p-dodecylphenyl, p-diethyl-aminophenyl, p-(pyrrolidino)phenyl, and the like.

Each $R_{21}$ is the same or different, and is an alkyl or cycloalkyl having from about 1 to about 12 carbon atoms. Two of the $R_{21}$ groups may together form a cyclic group. For example, $R_{21}$ may include methyl, ethyl, octyl, tetramethylene, pentamethylene, cyclohexyl or the like.

$R_{22}$ may include alkyl, phenyl, alkylphenyl or dialkylaminophenyl, having from about 1 to about 20 carbon atoms. For example, $R_{22}$ may include methyl, butyl, phenyl, p-butylphenyl, p-nonylphenyl, p-dimethylaminophenyl, p-diethylaminophenyl, p-(piperidino)phenyl, or the like.

Aldimines the same as or similar to those used in preparing the initiator, can also be used as terminating agents.

Other examples of useful modifying agents include tin tetrachloride, $(R_4)_3SnCl$, $(R_4)_2SnCl_2$, $R_4SnCl_3$, carbodiimides, N-methylpyrrolidine, cyclic amides, cyclic ureas, isocyanates, Schiff bases, 4,4'-bis(diethylamino) benzophenone, and the like, where $R_4$ is as described hereinabove.

One preferred polymer according to the present invention, is a polymer which includes at least one functional group A as discussed hereinabove, wherein A is derived from the reaction product of a substituted aldimine and an organolithium compound as also discussed hereinabove. Furthermore, a preferred polymer is multifunctional wherein the polymer also carries a tin-carbon bond, such as may be derived from the terminating, coupling or linking modifying agents. A rubber composition or a vulcanizable rubber composition according to the present invention, can include such a polymer.

The modifying agent is added to the reaction vessel, and the vessel is agitated for about 1 to about 1000 minutes. As a result, an elastomer is produced having an even greater affinity for reinforcing materials such as carbon black, and hence, even further reduced hysteresis. Additional examples of terminating agents include those found in U.S. Pat. No. 4,616,069 which is herein incorporated by reference.

The polymer may be recovered from the solvent by conventional techniques. These include steam or alcohol coagulation, thermal desolventization, or any other suitable method. Additionally, solvent may be removed from the resulting polymer by drum drying, extruder drying, vacuum drying or the like.

As is known in the art, batch polymerization processes, such as described above, can be converted to continuous processes by well known techniques.

Compounds of polymers according to the present invention may result in products exhibiting reduced hysteresis, which means a product having increased rebound, decreased rolling resistance and has less heat build-up when subjected to mechanical stress.

It has also been found, as will be exemplified hereinbelow, that polymers formed using the initiators of the invention, are reproducibly polymerizable in a relatively narrow range of molecular weights, such as that substantially consistently reproducible polymers are possible with a molecular weight range of about 20,000 to about 250,000.

The polymers of the present invention can be used alone or in combination with other elastomers to prepare an elastomer product such as a tire treadstock, sidewall stock or other tire component stock compound. In a tire of the invention, at least one such component is produced from a vulcanizable elastomeric or rubber composition. For example, the polymers according to the invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely such as between 10 and 99 percent by weight.

The polymers can be compounded with carbon black in amounts ranging from about 5 to about 100 parts by weight, per 100 parts of rubber (phr), with about 5 to about 80 parts being preferred and from about 40 to about 70 phr being more preferred. The carbon blacks may include any of the commonly available, commercially-produced carbon blacks but those having a surface area (EMSA) of at least 20 m²/g and more preferably at least 35 m²/g up to 200 m²/g or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following TABLE I.

TABLE I

CARBON BLACKS

| ASTM Designation (D-1765-82a) | Surface Area ($m^2/g$) (D-3765) |
|---|---|
| N-110 | 126 |
| N-220 | 111 |
| N-339 | 95 |
| N-330 | 83 |
| N-550 | 42 |
| N-660 | 35 |

The carbon blacks utilized in the preparation of the rubber compounds of the invention may be in pelletized form or an unpelletized flocculent mass. Preferably, for more uniform mixing, unpelletized carbon black is preferred. The reinforced rubber compounds can be cured in a conventional manner with known vulcanizing agents at about 0.5 to about 4 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents may be used alone or in combination.

Vulcanizable elastomeric or rubber compositions of the invention can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

General Experimental

In order to demonstrate the preparation and properties of the initiator mixtures and elastomers according to the present invention, a number of such initiator mixtures and elastomers were prepared. A number of solutions of styrene and butadiene monomers in hexane were prepared and were polymerized with the above described initiator mixtures. As noted above, various techniques known in the art for carrying out polymerizations may be employed without departing from the scope of the present invention.

In the following examples, parts and percents are by weight unless otherwise specified. Polymer structure was determined by gel permeation chromatography (GPC) for molecular weight and infrared spectroscopy (IR) for microstructure of diene portion and nuclear magnetic resonance spectrum (NMR) for styrene content. Also, "RT" is rrom temperature, "Eb" is elongation at break and "Tb" is tensile strength at break.

For evaluation of compounded properties, the strength at breakage was evaluated by using ring specimens. To evaluate hysteresis loss properties, the dynamic loss factor at 50° C. (tan δ) was measured by means of a Rheometrics viscoelastomer at 15 Hz. In general, the smaller the tan δ value, the lower the hysteresis loss.

Wear resistance was measured by means of a Lambourn abrasion tester and represented by an index based on the comparative example, as will be discussed hereinbelow. In general, the higher the index number, the better the wear resistance.

EXAMPLE 1

Schiff base and KOR system in n-hexane solvent

Bottle polymerization was carried out using 35% styrene and 65% butadiene blend (total monomer content of the blend was 18%). An initiator was prepared by reacting (DMa)BMA with butyl lithium. A mixture of the monomer blend in n-hexane, potassium t-amyloxide (KOR) randomizer, linear oligomeric oxolanyl propane and TMEDA was prepared, and the initiator then was added to the monomer mixture. Four bottles were used at different conditions as listed in Table II. Polymerization reaction was carried out at 50° C. for 3 hours and terminated by addition of isopropyl alcohol (i-PrOH). PrOH). The appearance of the polymer cements obtained were also noted in Table II.

TABLE II

COMPONENTS FOR SAMPLES A–D

| Sample | Blend (grams) | Schiff base-BuLi | K/Li | Chelate/Li | Polymer cement condition |
|---|---|---|---|---|---|
| A | 330.1 | 0.825 mmol | 1/20 | No | Heterogeneous, Partly reddish |
| B | 328.4 | 0.825 | 1/20 | CA*/Li = 1/30 | White dispersion |
| C | 325.8 | 0.825 | 1/20 | CA*/Li = 1/10 | White dispersion |
| D | 334.6 | 0.825 | 1/20 | TMEDA/ Li = 1/10 | White dispersion |

*CA is linear oligomeric axolanyl propane

The polymers were isolated by coagulation in i-PrOH, treated with a small amount of antioxidant (butylated hydroxy toluene) and drum dried. Analysis data for Sample A–D are listed in Table III.

TABLE III

ANALYSIS DATA FOR SAMPLES A–D

| Sample | Conversion (%) | Mn (×$10^5$) | Mw/Mn | Vinyl (%)[b] | Styrene (%) |
|---|---|---|---|---|---|
| A[a] | 35.2 | 0.73 | 1.37 | 14.8 | 19.1 |
| B | 87.2 | 1.24 | 1.41 | 53.8 | 35.4 |
| C | 92.4 | 1.41 | 1.45 | 61.5 | 35.2 |
| D | 89.6 | 1.17 | 1.52 | 56.4 | 34.8 |

[a]Only hexane soluble portion was analyzed.
[b]Based on butadiene part.

Without the chelating reagent, the polymer cement is heterogeneous and conversion of isolated polymer is very low (35%) as is the vinyl content.

EXAMPLE 2

Schiff base and KOR system in n-hexane solvent

Bottle polymerizations were carried out using a 40% styrene/60% butadiene blends and in another case, 25% styrene/75% butadiene as will be described hereinbelow. Total monomer content of the 25% styrene blend was 25%, and for the 40% styrene blned, 15% monomer, both in n-hexane. A reaction mixture of equimolar amounts of BuLi and the aldimine as in Example 1 were added to the monomer blend containing potassium t-amyl alcoholate (KOR) modifier. The four bottles were polymerized under the conditions in Table IV, three bottles for 1.6 hrs. at 80° C. and one bottle for 3.2 hrs. at 50° C., followed by termination with one Li equivalent of 4-dimethylaminobenzylidene-4-butylaniline, then i-PrOH. The appearance of the polymer cements are also noted in Table IV.

The polymers were isolated by coagulation in i-PrOH, treated with antioxidant (a mixture of butylated hydroxy toluene from Koppers Co. of Pittsburgh Pa. and UOP-88 from Universal Oil Products, Des Plaines, Ill.) and drum dried. The analytical data for Samples E–H are listed in Table V. With the high levels of potassium randomizer and without the chelating agent the polymer cement is quite homogeneous but vinyl content is relatively high.

These polymers were evaluated in a standard rubber recipe (Polymer 100 parts by weight; HAF carbon black, 55; Oil, 10; Sulfur 1.5). The results are listed in Table VI. Very high hysteresis compounds were obtained with the high styrene/high vinyl polymers and the lower styrene/high vinyl monomer made with KOR modifier. The polymer made without KOR was much slower polymerizing and had very low styrene incorporation.

TABLE IV

COMPONENTS FOR SAMPLES E–H

| Sample | Blend (g) | Schiff base-BuLi | L/Li | Chelate/Li | Polymer cement condition |
|---|---|---|---|---|---|
| E<sup>a</sup> | 402.0 | 0.965 | None | None | Homogeneous |
| F<sup>a</sup> | 404.3 | 0.485 | 1.0 | None | Red-violet, clear-homogeneous |
| G<sup>a</sup> | 402.7 | 0.482 | 2.0 | None | Purple, Foggy dispersion |
| H<sup>b</sup> | 301.4 | 0.754 | 1.0 | None | Clear, homogeneous (red-violet) |

<sup>a</sup>1.6 hours at 80° C.
<sup>b</sup>75/25, Butadiene/Styrene; 25.0% monomer in n-hexane; 3.2 hrs. at 50° C.

TABLE V

ANALYSIS DATA FOR SAMPLES E–H

| Sample | Conversion (5) | Mn (×10$^5$) | Mw/Mn | Vinyl (%) | Styrene (%) | Polymer Properties (RT) |
|---|---|---|---|---|---|---|
| E | 66.5 | 1.12 | 1.80 | 13.9 | 15.1 | Elastomeric |
| F | 91.1 | 1.14 | 1.94 | 56.3 | 40.3 | Stiff, bends slightly |
| G | 91.2 | 0.76 | 2.30 | 60.3 | 41.5 | Very stiff, hard |
| H | 94.1 | 1.07 | 1.71 | 50.1 | 27.4 | Tough, slightly stiff |

TABLE VI

PHYSICAL DATA FOR SAMPLES E–H

| Sample | Tb(kg/cm$^2$, RT) | Eb(%/RT) | Tan δ (50° C.) |
|---|---|---|---|
| E | 236 | 565 | 0.121 |
| F | 138 | 249 | 0.711 |
| G | 132 | 201 | 0.656 |
| H | 186 | 404 | 0.170 |

EXAMPLE 3

Schiff base and KOR system in cyclohexane solvent

Bottle polymerization was carried out using 40% styrene and 60% butadiene blend (total monomer content of the blend is 16% in cyclohexane). BuLi alone and the reaction mixture of the Schiff base of Example 1 and BuLi (1:1 moles) were used as initiators. Potassium t-amyl alcoholate (KOR) was used as randomizer. Four bottles were used at different conditions as listed in Table VII. Polymerization reaction was carried out at 50° C. for 3 hours (BuLi initiation system) or 5 hours (lithio-Schiff base initiation systems) and terminated by addition of isopropyl alcohol (i-PrOH) or Bu$_3$SnCl. Isolated yield of each batch was more than 90%. Analysis data of obtained polymer are also listed in Table VII.

TABLE VII

COMPONENTS AND ANALYSIS DATA FOR SAMPLES I–L

| Sample | Initiator | Terminator | Mn | Mw/Mn | Vinyl (%)<sup>c</sup> | Styrene (%) |
|---|---|---|---|---|---|---|
| I | BuLi alone | i-PrOH | 9 × 10$^4$ | 1.51 | 16.7 | 39.0 |
| J | BuLi alone | Bu3SnCl | 8.3 × 10$^4$ | 1.60 | 16.5 | 38.7 |
| K | Schiff base/BuLi | i-PrOH | 8.1 × 10$^4$ | 1.58 | 14.6 | 41.3 |
| L | Schiff base/BuLi | Bu3SnCl | 9.2 × 10$^4$ | 1.49 | 14.1 | 40.6 |

<sup>c</sup>Based on butadiene part

Compound physical properties of these polymers and a control, SBR #1500 (a commercially available emulsion styrene/butadiene rubber; 23.5% styrene and 18% vinyl) were evaluated by standard recipe (Polymer 100 parts by weight, HAF carbon black 50, Oil 10, Sulfur 1.5). The results are listed in Table VIII.

TABLE VIII

PHYSICAL PROPERTIES FOR SAMPLES I–L

| Sample | Tb kg/cm$^2$, RT | Eb (%, RT) | Wear Index | Tan δ (50° C.) |
|---|---|---|---|---|
| I | 220 | 486 | 88 | 0.178 |
| J | 237 | 440 | 97 | 0.130 |
| K | 253 | 451 | 94 | 0.126 |
| L | 268 | 404 | 105 | 0.104 |
| #1500 | 262 | 512 | 100 | 0.160 |

Polymers K and L, especially L, showed lower hysteresis loss properties than polymer I and #1500.

Therefore, this system (lithio-Schiff base/KOR) works well in all cyclohexane solvent, but not as well as in n-hexane solvent.

These example polymers show higher tensile properties and wear resistance, and also lower hysteresis loss property than the control SBR.

It is clear from the foregoing examples and specification disclosure, that initiators according to the present invention are useful for the anionic polymerization of diene monomers. Reproducible polymerization of such polymers within a relatively narrow molecular weight range is achieved, and the resulting polymers also exhibit good preservation of live C-Li ends, when compared to the initiators heretofore known in the art.

It is to be understood that the invention is not limited to the specific initiator reactants, monomers, terminators, polar coordinators or solvents disclosed herein, except as otherwise stated in the specification. Similarly, the examples have been provided merely to demonstrate practice of the subject invention and do not constitute limitations of the invention. Those skilled in the art may readily select other monomers and process conditions, according to the disclosure made hereinabove.

Thus, it is believed that any of the variables disclosed herein can readily be determined and controlled without departing from the scope of the invention herein disclosed and described. Moreover, the scope of the invention shall include all modifications and variations that fall within the scope of the attached claims.

What is claimed is:

1. A process for preparing an elastomeric compound having reduced hysteresis properties comprising the steps of:
- forming a solution of one or more anionically polymerizable monomers in a hydrocarbon solvent; and,
- polymerizing said monomer with a mixture of lithio dimethyl amino benzylidene methylamine, potassium t-amyloxide randomizer, and a chelating reagent selected from the group consisting of linear oligomeric oxolanyl propane and tetramethylethylene diamine, to form a polymer.

2. A process, as set forth in claim 1, wherein said monomers are selected from the group consisting of styrene and butadiene, and mixtures thereof.

3. A process, as set forth in claim 1, comprising the further step of reacting the polymerized monomer with a modifying agent selected and derived from the group consisting of terminating agents, coupling agents and linking agents.

4. A process as set forth in claim 1 comprising the further step of compounding said polymer with from about 5 to 80 parts by weight of carbon black, per 100 parts of said polymer, to form a vulcanizable compound.

5. A process as set forth in claim 4, comprising the further step of forming a treadstock from said vulcanizable compound.

6. A process as set forth in claim 5, comprising the further step of forming a tire having at least one component formed from said treadstock compound.

* * * * *